United States Patent [19]

Thompson

[11] Patent Number: 4,944,446
[45] Date of Patent: Jul. 31, 1990

[54] AUTOMATIC PREFORM DISPENSER

[75] Inventor: Ted L. Thompson, Boise, Id.

[73] Assignee: Micron Technology, Inc., Boise, Id.

[21] Appl. No.: 430,257

[22] Filed: Nov. 2, 1989

[51] Int. Cl.⁵ ............................................. B23K 3/06
[52] U.S. Cl. .................................... 228/102; 228/245;
   228/8; 228/14; 29/417; 83/76.1; 83/50; 83/409
[58] Field of Search ..................... 228/102, 245, 8, 13,
       228/14, 41, 56.3, 123, 170; 29/417, 563;
       83/76.1, 50, 409

[56]          References Cited
         U.S. PATENT DOCUMENTS

| 3,149,510 | 9/1964 | Kulicke, Jr. | 228/4.5 |
| 3,958,742 | 5/1976 | Howarth et al. | 228/14 |
| 4,422,568 | 12/1983 | Elles et al. | 228/179 |
| 4,832,246 | 5/1989 | Ono et al. | 228/56.3 |

*Primary Examiner*—Sam Heinrich
*Attorney, Agent, or Firm*—Stanley N. Protigal; Angus C. Fox; Jon P. Busack

[57]             ABSTRACT

A method and apparatus for feeding preform wire into a preform dispenser, cutting a piece of preform, transferring the preform to a location over an integrated circuit ceramic package, and placing the preform in the package prior to placing and attaching a die in the ceramic package.

18 Claims, 7 Drawing Sheets

AUTOMATIC PREFORM DISPENSER

BACKGROUND OF THE INVENTION

This invention relates to an apparatus and method for cutting a gold ribbon to a predetermined length and then placing a piece of cut ribbon (the preform) on an integrated circuit (IC) die base in preparation for IC die placement and attachment.

The gold ribbon used in the process of the present invention is often less than 2.0 mils in thickness and must be cut to length within a tolerance of, for example, 0.0005 inches, and then precisely placed on the IC die base. Precision is required so that during bonding with a die-attach machine, the preform contacts and is properly bonded to the die that is placed on top of the preform. Preforms that are too short will result in poor bonding or voids. Preforms cut too long will not seat properly in the die base.

A preform is typically 0.200 to 0.400 inches in length, with a thickness of 0.002 inches and width of 0.150 to 0.400 inches. It must be precisely placed on the ceramic base in the XY plane (horizontal) and Z direction (vertical).

Figure 1:
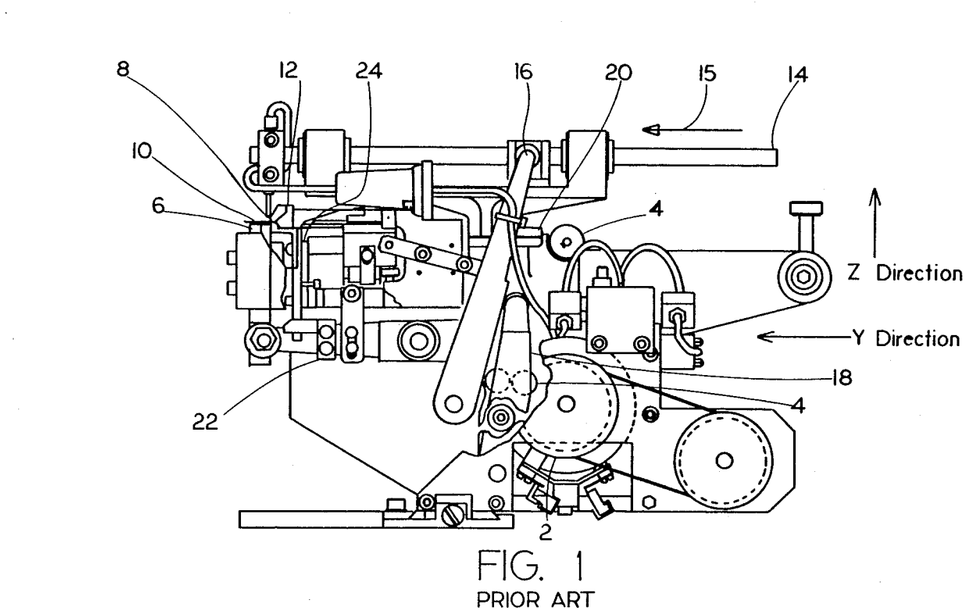
FIG. 1 is an elevation view of a preform dispenser of the prior art.

The prior art hitch feed preform dispenser widely used in the industry illustrated in FIG. 1 is by Kulicke. It is controlled by a cam assembly driven by a motor. The numerous rollers and linkages are subject to wear which induces inaccuracies in cutting the gold ribbon to precise length and in positioning the preform on the IC die. The operation of this device is set forth in detail below.

Additionally, U.S. Pat. No. 3,149,510 issued on Sept. 22, 1964, discloses a fine wire manipulator and bonding instrument for transistors. The device does not cut the wire but merely positions the wire correctly for bonding when manually activated.

Finally, U.S. Pat. No. 4,422,568 issued on Dec. 27, 1983, discloses a method of making constant bonding wire tail lengths as part of a high speed automatic fine wire bonding machine.

SUMMARY OF THE INVENTION

The automatic preform dispenser of this invention enables the precision cutting and placement of a small ribbon of gold precisely in the cavity of an IC package prior to the die-attach operation. While the apparatus of this invention finds particular relevance with ceramic IC packages, it should be appreciated that the invention will function adequately on most commercially available packages, including plastic and metal. The inventive device provides more precise positioning of the preform, more rigidity of the preform cutting devices, and more flexibility in operation than prior art apparatus. Operation is controlled by a programmable logic controller (PLC) so that the unit is operational as a stand-alone system, or the device is operable from signals originating in the die-attach machine.

The automatic preform dispenser attaches to a positioning table in a generally horizontal X-Y plane where X is perpendicular to machine motion and Y is parallel to machine motion. The X-Y table is also adjustable in the Z-direction—that is, in a plane perpendicular to the plane of the X-Y table. The dispenser includes a reel of gold ribbon which is fed into the cutting area by means of a pair of rolls that automatically feed a predetermined quantity of gold ribbon to the cutting blade area. The cutting blade is actuated by a pneumatic cylinder after a vacuum pickup tip is lowered over the gold ribbon to hold it in place until the blade cuts the gold ribbon. Once cut, the tip holds the cut ribbon (preform), raises it in the Z-direction (vertical), and by pneumatic piston relocates the preform in the Y-direction to a new "place" position over the IC package. The preform is then lowered into the package and placed by releasing the vacuum. The vacuum tip then reverses the process in the Z and Y direction and returns to its starting position.

DETAILED DESCRIPTION OF THE INVENTION

In order to better illustrate the improvements of the inventive automatic preform dispenser, the operation of the prior art (as illustrated in FIG. 1) will be described.

The prior art preform dispenser 1 is primarily a mechanical device which is controlled by the motor-driven cam bank assembly 2 and rollers 4. One revolution of the cam bank assembly 2 causes the device to complete a full cycle. Briefly, a full cycle comprises the following steps:

a. The blade 6 moves up and the vacuum operated pick-up tip 8 moves down, capturing the preform 10 therebetween.

b. The blade 6 continues up, cutting the preform 10 by bearing against the shear block 12.

c. The blade 6 and pick-up tip 8 both reverse direction, the pick-up tip 8 moving upwardly with the severed preform 10.

d. The slider bar 14 moves in the direction of arrow 15 driven by the slider link assembly 16 and drive link assembly 18.

e. When the slider bar 14 is at maximum extension, it is pivoted about the clamp plate 20 by cam action, not shown in FIG. 1, causing the pick-up tip 8 and preform 10 to move downwardly such that the preform is placed in the desired location. The vacuum is released in the pick-up tip 8 and the preform 10 is in the appropriate cavity on the IC die.

f. As the cam bank assembly 2 continues in its cycle, the slider link assembly 16 retracts the slider bar 14 in the direction opposite that of arrow 15.

g. Simultaneously, the shear clamp actuator 22 and carriage assembly 24 are actuated, causing the strip of preform 10 to be fed out in preparation for the next shear cycle.

The process described above results from a mechanical device having a number of linkages subject to normal manufacturing tolerances and other components subject to wear, all of which contributes to inaccuracies in operation of the device.

Figure 2:
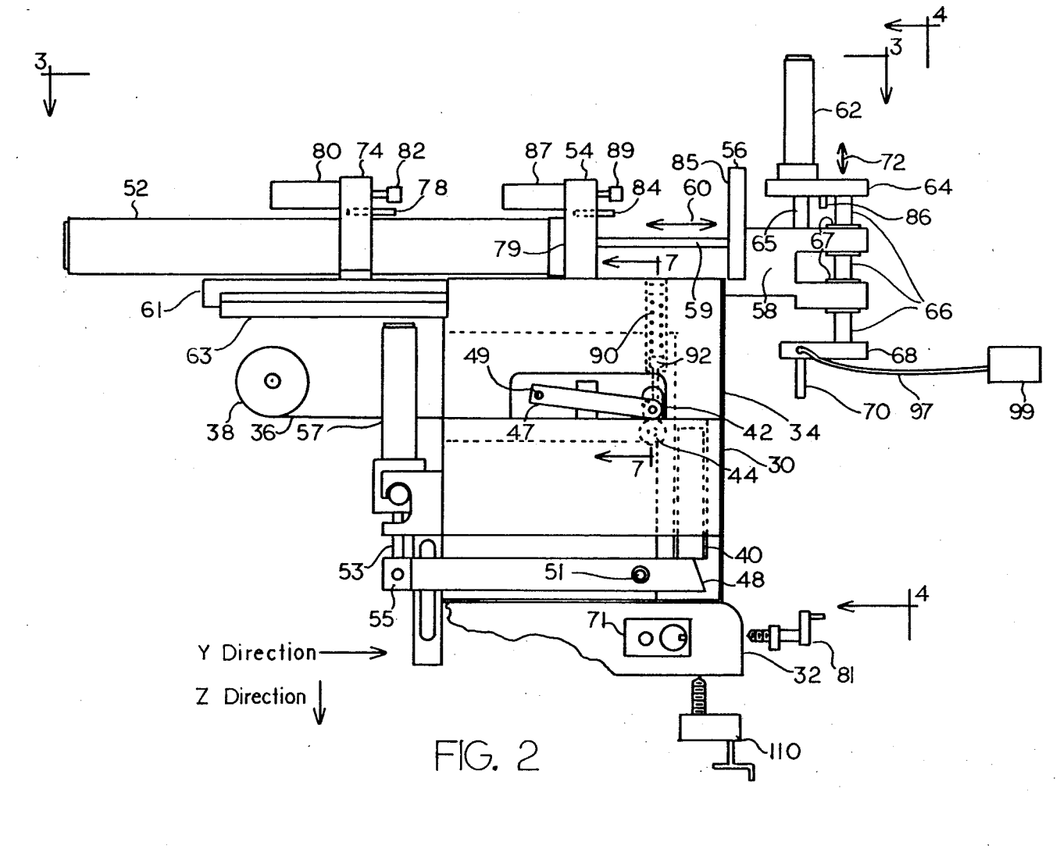
FIG. 2 is an elevation view of the automatic preform dispenser of the present invention.
Figure 3:
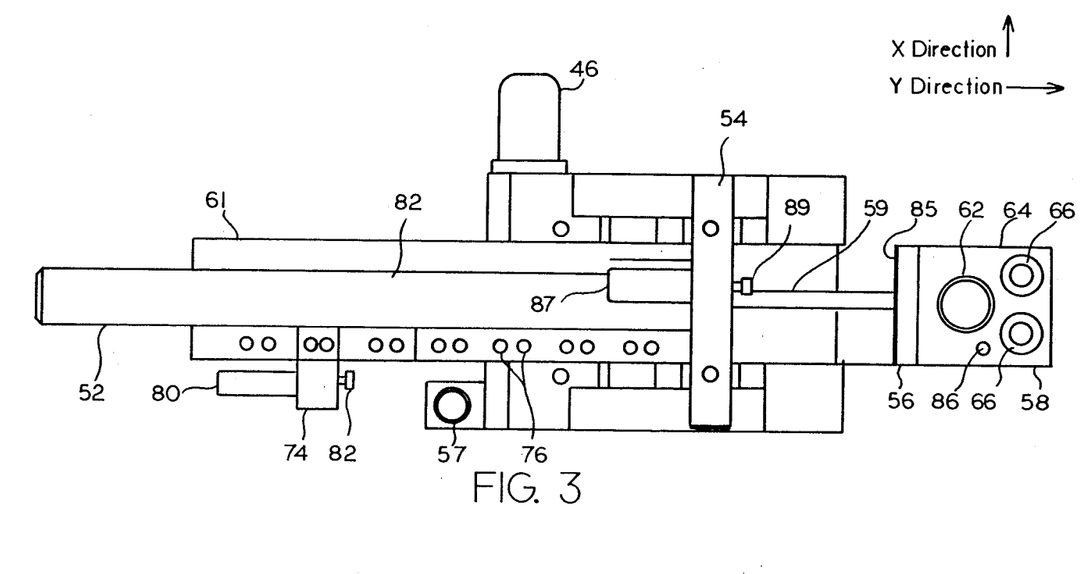
FIG. 3 is a plan view of the automatic preform dispenser of the present invention.

The device of the present invention solves the problems inherent in the prior art apparatus. As illustrated in FIG. 2, lower housing 30 is securely affixed to the XYZ micrometer-adjustable positioning table 32 below and upper housing 34 above. The gold ribbon 36 is fed from reel 38 to cutting blade 40 by means of upper pinch roll 42 and lower pinch roll 44. Lower pinch roll 44 is powered by stepper motor 46 (FIG. 3). Upper pinch roll 42 is supported and retained by a pair of pivoted upper pinch roll supports 47 which pivot about pivot point 49. Stepper motor 46 is controlled by an indexer (not shown) which receives control input from the programmable logic controller (PLC).

The cutting blade 40 is actuated to its upward cutting position by a blade actuator 48. The blade actuator 48 pivots about pivot point 51, and is in turn actuated by piston 53. The piston 53 is pivotally affixed to actuator 48 at 55, and is powered by a first pneumatic (trunion) cylinder 57.

A second pneumatic cylinder 52 (actuating in the "Y" direction) is supported by pneumatic actuator support 54 which is affixed to the upper housing 34. The piston 59 of cylinder 52 is affixed to arm stop 56. Arm stop 56 is secured to pick-and-place member 58 and is caused to move in the direction of arrow 60 (the "Y" direction) by actuation of piston 59 and cylinder 52. Member 58 is provided with an extension arm 61 sliding within low friction linear bearing 63.

Motion in the Z direction (up and down) is provided by actuation of a third pneumatic cylinder 62 which is fixedly secured to upper clamp 64. The piston 65 is secured to member 58. Actuation of the piston 65 of this pneumatic cylinder 62 causes the cylinder 62 to either raise and/or lower the clamp 64. A shaft 66 is slidably retained within a pair of sleeves 67, and is securely affixed at its upper end to the upper clamp 64 and at the lower end to lower clamp 68. Pick-up tip 70 is secured to the lower clamp 68, so that upon actuation of piston 65, the pick-up tip 70 is either raised or lowered.

In a preferred embodiment, maximum horizontal Y plane movement (arrow 60) is approximately 6 inches, and maximum vertical Z plane movement (arrow 72) is about 1 inch or less. Linear motion in the Y-direction (to the right in FIG. 2) is varied by changing the location of adjustable damper support 74 on extension arm 61. Means are uniformly spaced along arm 61 to provide coarse adjustment of damper support 74 in the Y-direction, such as threaded apertures 76 (FIG. 3). Fine adjustment in the Y-direction is provided by a threaded hard stop member 78 threaded into damper support 74. The hard stop member 78 limits travel (to the right in the view of FIG. 2) of the member 58 by impacting against "place" hard stop 79 of support 54. Final adjustment of the member 58 over the "place" position is accomplished by adjusting Y-direction micrometer 81. Just prior to contact between stop member 78 and place hard stop 79, motion of the pick-and-place member 58 is slowed by hydraulic damper 80 as damper tip 82 contacts place hard stop 79 of support pneumatic actuator 54. Hydraulic damper 80 is conventionally provided with hydraulic orifice adjustment screws (not shown) providing adjustment of damping action (deceleration).

Likewise, Y-direction motion (to the left as viewed in FIG. 2) is governed by threaded pick hard stop 84 contacting the face 85 of arm stop 56. Motion is damped by a second hydraulic damper 87 and damper tip 89 contacting arm stop 56 prior to contacting pick hard stop 84.

Similarly, downward (Z direction) motion of pick-up tip 70 is controlled by an adjustable threaded hard stop 86 that threads into upper clamp 64 and stops downward motion in the direction of arrow 72, when down hard stop 86 contacts the pick-and-place member 58. The fine Z-direction adjustment over the package is made using the Z-micrometer 110.

FIG. 3 illustrates in plan view the automatic preform dispenser of the present invention. As illustrated, the gross adjustment means in the Y-direction comprise a plurality of threaded apertures 76 indicating the adjustable locations of damper support 74. Other means well-known to those skilled in this art will be readily apparent.

Figure 4:
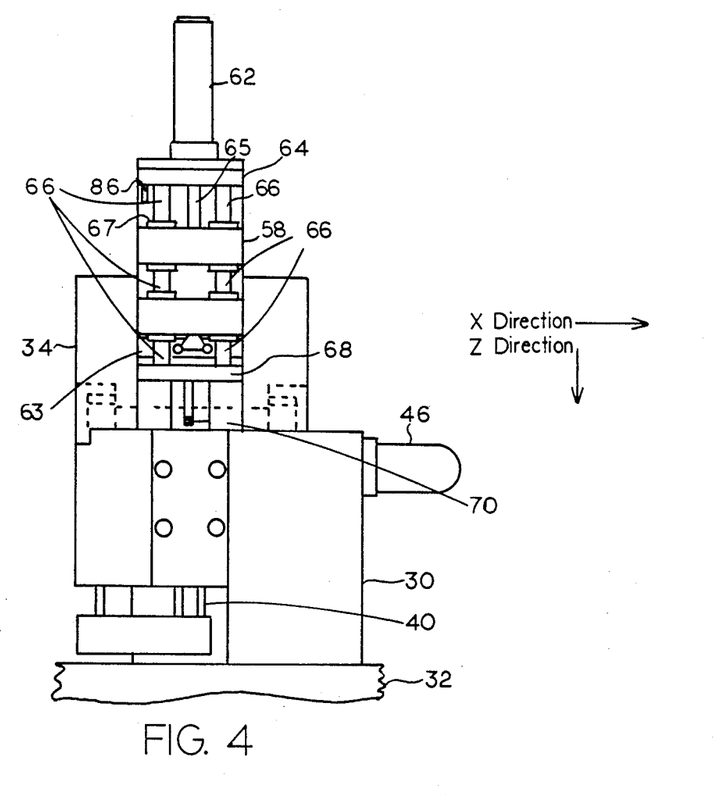
FIG. 4 is an end view of the automatic preform dispenser.

FIG. 4 illustrates an end view of the automatic preform dispenser and identifies the pair of shafts 66 that interconnect the upper clamp 64 and lower clamp 68. The U-shaped configuration of member 58 and the pair of shafts 66 insures uniform movement of the pick-up tip 70 in the Z direction. Piston 65 is threadably engaged with member 58 and the cylinder 62 is threaded into upper clamp 64.

Figure 5:
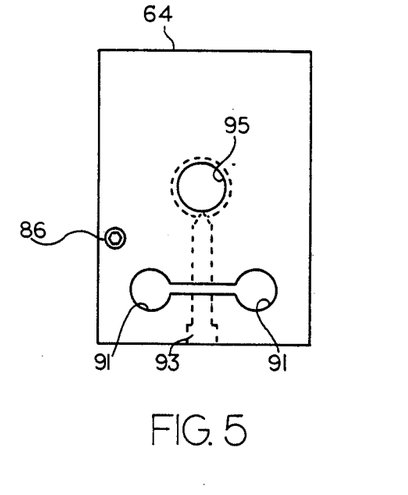
FIG. 5 is a plan view of the pick-up tip upper clamp.

FIG. 5 is a plan view of the upper clamp 64 and the adjustably threaded, down hard stop 86. Shafts 66 are secured to the upper clamp 64 within the apertures 91, as with set screw 93. Cylinder 62 (FIG. 4) is threaded into and is retained in aperture 95.

Figure 6:
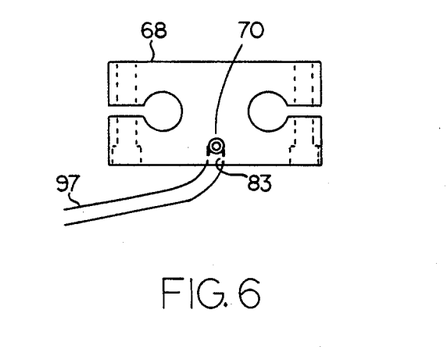
FIG. 6 is a plan view of the lower clamp and pick-up tip.

FIG. 6 is plan view illustrating the lower clamp 68 and pick-up tip 70. Pick-up tip 70 is threaded into lower clamp 68, which is provided with a passage to an aperture 83 and thence to vacuum line 97. A vacuum is drawn through line 97 and tip 70 external of the device by a conventional vacuum source 99 (FIG. 2).

Figure 7:
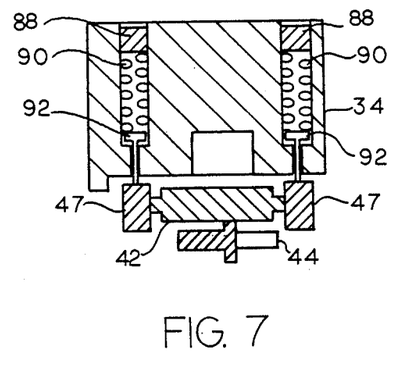
FIG. 7 is a section view taken along section lines 7—7 of FIG. 2.

FIG. 7 illustrates in section view the upper pinch roll compression assembly utilizing a pair of roll adjust screws 88 to vary the force of roll compression springs 90 on roll compression pins 92. The roll compression pins 92 provide variable force to the upper pinch roll supports 47 that support upper pinch roll 42. The lower pinch roll 44 is not adjustable in this embodiment.

Figure 8:
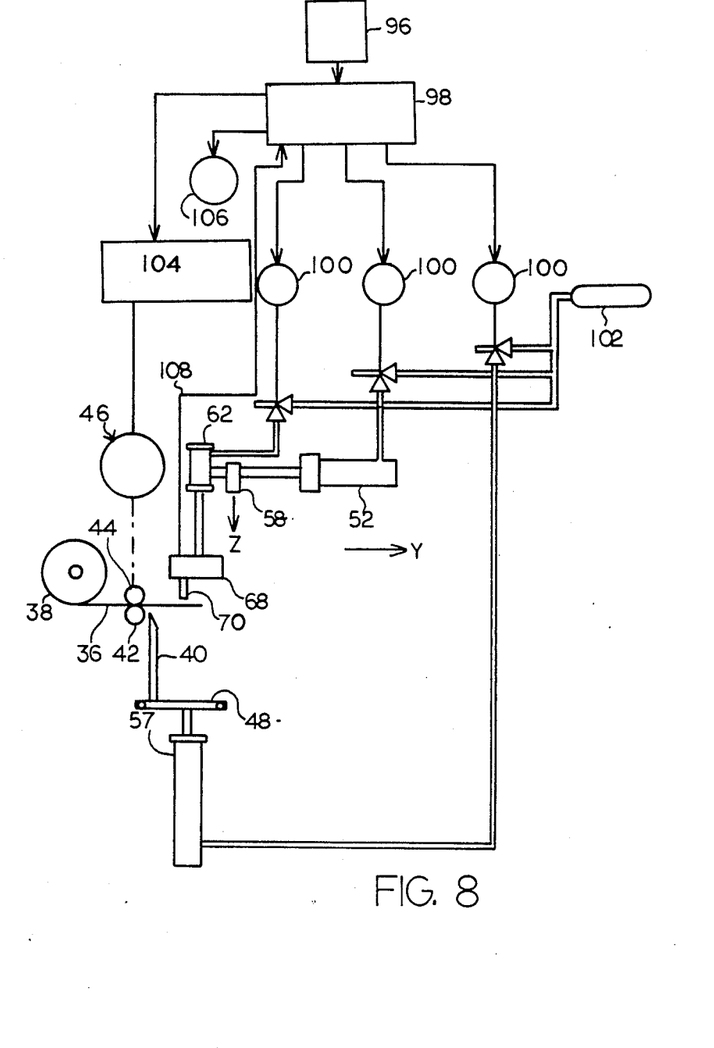
FIG. 8 is a schematic drawing illustrating the interconnection of electrical and mechanical devices.

FIG. 8 illustrates in schematic form the various electrical signals and pneumatic and mechanical devices that control the gold ribbon feed, cut, pick up and place procedures. The system start signal is initiated by an electrical signal from the die attach machine 96 to the programmable logic controller (PLC) 98. The PLC has been previously programmed to sequentially initiate electrical signals that actuate the three solenoid valves 100. The solenoid valves 100 in turn open and close to allow pressurized air from air supply 102 to enter the trunnion pneumatic cylinder 57, the cylinder 62 and the pneumatic cylinder 52, causing cut, pick up and place action, respectively. The PLC also initiates an electric signal to indexer 104 which has been previously programmed to turn stepper motor 46 a specific number of turns or partial turns, thereby controlling the length to which the gold ribbon 36 is cut. When the pick-up tip 70 is raised after the preform cut operation, and there is no cut preform wire held by the tip, alarm 106 is activated by an electric signal 108 from a vacuum sensor in the pick-up tip 70.

Set up and operation of the inventive device will be described by referring to FIG. 2, unless otherwise stated.

The preform dispenser is adjustably mounted on the XYZ table 32 which in turn is mounted on the die attach machine (not shown). To set up the preform dispenser apparatus the following steps are performed:

1. The approximate height adjustment for the pickup tip (both for pick-up and placement) is set by threading the down hard stop 86 either up or down. Vernier adjustment of this height is then completed by adjusting the Z direction micrometer 110 of XYZ table 32;

2.
   a. The approximate Y-direction location for the preform to be placed is roughly set by selecting a position for damper support 74 on extension arm 61. Finer adjustment is made by adjusting place hard stop 78 and final vernier adjustment is completed by adjusting Y-direction micrometer 81;
   b. Fine adjustment of pick-up location is made by adjusting the pick-up hard stop 84. Vernier adjustment is not performed by readjusting Y-direction micrometer 81, since that would misadjust the Y-direction place location performed in step 2a above.

3. The table is centered in the X-direction by adjusting X-direction micrometer 71.

4. The amount of gold ribbon 36 to be fed into the preform dispenser is programmed into indexer 104 (FIG. 8).

5. The timing for the electrical control signals is set into the PLC 98 (FIG. 8). Finally, 6. Preform wire 36 is fed from reel 38 into the upper and lower pinch rolls 42 and 44.

Referring to FIG. 8, one cycle of the preform dispenser proceeds in the following manner. A signal is received by the PLC 98 from the die attach machine 96 and it in turn sends a signal to the indexer 104 which feeds a preset amount of gold ribbon 36. The pick-up tip 70 moves to a pick-up position (to the left in FIGS. 2 and 8) and then descends and pinches the gold ribbon 36 between itself and the blade 40. When the pick-up tip 70 has reached the down position indicated by a sensor, the vacuum in pick-up tip 70 is activated and the blade 40 cycles upwardly due to the programmed action of the trunnion pneumatic cylinder 57 acting pivotally through blade actuator 48. Once the preform has been cut, the pick-up tip 70 retracts lifting the cut portion of preform off the blade 40. If no preform is detected by the pick-up tip 70, a signal 108 stops the cycle and an alarm 106 sounds. If the sensor detects a preform, the cycle continues, the piston 52 moves member 58 to the "place" position, and cylinder 62 is actuated to cause lower clamp 68 and pick-up tip 70 to be positioned to place the preform in the IC die base. The pick-and-place member 58 then retracts and the system is ready to cycle again. In all cases the activation of the three air cylinders is initiated by electrical activation of solenoid valves 100 permitting air from air supply 102 to enter the air cylinders or on deactivation to vent out through the solenoid valves 100. The solenoids are in turn controlled by signals from the PLC 98.

The apparatus of the present invention is more rigid as a result of fewer moving parts and more rigid components. The improvement in positioning of preform results from increased rigidity, the use of hard stops, rigid sleeves, linear bearings and pneumatic cylinders. Preform length is precisely controlled by the stepper motor which controls the pinch roller assembly that feeds the gold ribbon. This system allows for control of preform length to within 0.0005 inches. Flexibility of the system to varying preform sizes, and preform placement results from the infinite variability of the PLC.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

I claim:

1. An automatic preform dispenser apparatus for cutting and placing a predetermined length of preform on an integrated circuit (IC) package, comprising:
   a. means for advancing a predetermined length of preform;
   b. a blade and blade actuating means in the form of a first pneumatic cylinder positioned adjacent to the preform to cut a predetermined length of preform;
   c. a vacuum operable preform pick-up tip operable between a pick-up location and an IC package;
   d. means in the form of a second pneumatic cylinder to move the pick-up tip in a horizontal (Y) plane between a pick-up location and the IC package;
   e. means in the form of a third pneumatic cylinder to move the pick-up tip in a vertical (Z) plane;
   f. an adjustable XYZ table for supporting the automatic preform apparatus and providing micrometer adjustment in X, Y and Z directions; and
   g. programmable means for controlling sequential operation of the apparatus.

2. The apparatus as recited in claim 1, wherein the means for advancing a predetermined length of preform comprises:
   a. a stepper motor;
   b. a lower pinch roll; and
   c. an adjustable upper pinch roll compression assembly further comprising;
      i. a pair of upper pinch roll supports, one of said supports affixed to each end of the upper pinch roll;
      ii. a pair of roll compression springs one of said springs associated with each upper pinch roll support;
      iii. a pair of roll compression pins one of said pins between each compression spring and upper pinch roll support; and
      iv. a pair of roll adjust screws, one of said screws associated with each spring to adjust the tension to each spring;

3. The apparatus as recited in claim 1, wherein the blade actuating means comprises:
   a. a blade actuator in engagement with the blade;
   b. the first pneumatic cylinder pivotally connected to the blade actuator; and
   c. means for controlling an air supply to the the first pneumatic cylinder.

4. The apparatus as recited in claim 1, wherein the means to move the pick-up tip in a vertical (Z) plane comprises:
   a. the third pneumatic cylinder;
   b. an upper clamp affixed to the third pneumatic cylinder;
   c. a lower clamp supporting the vacuum-operated pick-up tip; and
   d. a pair of ground shafts interconnecting the upper and lower clamps.

5. The apparatus as recited in claim 1, wherein the means to move the pick-up tip in a horizontal (Y) plane comprises:

a. the second pneumatic cylinder mounted on a pneumatic actuator support above an upper housing, the cylinder having a piston connected to an arm stop;

b. a pick-and-place member having an extension arm slidably retained within a linear bearing and securely fastened to the arm stop;

c. a first damper affixed to the actuator support;

d. an adjustable pick hard stop affixed to the actuator support, said pick hard stop contacting the arm stop to prevent Y-plane movement in a first direction above said blade;

e. a second damper affixed to the extension arm of the pick-and-place member to adjust placement of the preform during placement of said preform; and f. an adjustable place hard stop affixed to the second damper wherein the place hard stop contacts the actuator support to prevent Y-plane movement in a second direction above said IC package.

6. The apparatus as recited in claim 5, wherein the pick-up tip comprises a sensing device to sense the absence of a preform after the vacuum is actuated, said sensing device having means to stop the apparatus and signal the absence of said preform.

7. The apparatus as recited in claim 5, wherein the second damper support is adjustably affixed to the extension arm of the pick-and-place member to provide coarse adjustment of the pick-and-place member in the second direction of Y-plane movement.

8. The apparatus as recited in claim 7, wherein the XYZ table comprises a Y-direction micrometer to provide vernier adjustment of the pick-and-place member in the Y-direction.

9. The apparatus as recited in claim 1, wherein the means to move the pick-up tip in the Z-direction comprises the third pneumatic cylinder securely affixed to an upper clamp, a piston cooperating with the cylinder and securely affixed to the pick-and-place member, at least one shaft interconnecting the upper clamp to a lower clamp, and an adjustable down hard stop member affixed to the upper clamp.

10. The apparatus as recited in claim 9, wherein a Z-direction micrometer incorporated into the XYZ table provides vernier adjustment of movement in the Z-direction.

11. The apparatus as recited in claim 10, wherein the vacuum-operable pick-up tip is provided on the lower clamp.

12. A method of cutting a predetermined length of preform and transferring the preform to an integrated circuit (IC) package, comprising:

a. programming a programmable logic controller (PLC) to control an automatic preform dispenser apparatus;

b. presetting an indexer to control preform length;

c. setting a plurality of X-Y-Z-direction travel stops;

d. advancing the gold ribbon to a cutting blade;

e. holding the gold ribbon between a vacuum pick-up tip and a cutting blade;

f. cutting the gold ribbon with the cutting blade;

g. picking up and transferring the preform to the (IC) package with a linear motion pick-and-place member means;

h. placing the preform in the IC package; and i. retracting the linear motion pick-and-place member means.

13. The method as recited in claim 12, further comprising programming the PLC to select the timing and sequence of a plurality of electrical output signals that actuate electrical solenoids and the indexer.

14. The method as recited in claim 12, further comprising presetting the indexer to control the amount of rotation of a stepper motor, such that rotation of lower and upper pinch rolls feed a precise length of preform wire to the cutting blade.

15. The method as recited in claim 13, further comprising adjustably compressing the upper pinch roll and lower pinch roll with an apparatus comprising:

a. a pair of upper pinch roll supports, one of said supports connected to each end of said upper pinch rolls.

b. a pair of roll compression springs one of said springs associated with each of said supports;

c. a pair of roll compression pins one of said pins between each compression spring and support;

d. a pair of roll adjust screws one of said screws associated with each compression spring to adjust the tension of each compression pin;

16. The method as recited in claim 12, further comprising:

a. adusting movement in the Y-direction by setting a plurality of Y-direction stops, said stops comprising:

i. an adjustable location on an extension arm of the pick-and-place member for mounting a damper support;

ii. a threaded adjustable place hard stop that terminates pick-and-place member Y-direction motion in a place location when it contacts a fixed pneumatic actuator support; and iii. an adjustable Y-direction micrometer mounted so as to provide vernier adjustment to an XYZ table that supports the automatic preform dispenser machine.

b. adjusting movement in the Z-direction with a down hard stop, wherein downward motion of third pneumatic cylinder-controlled pick-up tip is stopped by the down hard stop contacting a pick-and-place member having an extension arm;

17. The method as stated in claim 12, wherein the holding, cutting and transferring operation further comprises:

a. lowering a pick-up tip in the Z-direction by a third pneumatic cylinder until the pick-up tip contacts the gold ribbon and vacuum is drawn within the pick-up tip thereby holding the preform wire;

b. cutting the gold ribbon by a means of a first pneumatic cylinder acting through a blade actuator to raise the blade;

c. raising the pick-up tip by means of the third pneumatic cylinder;

d. transferring the preform in the Y-direction to a place location over the IC ceramic package by means of a Y-direction second pneumatic cylinder operating on a pick-and-place member;

e. lowering the preform into the IC ceramic package by means of third pneumatic cylinder;

f. releasing the preform in the IC ceramic package by breaking the vacuum in the pick-up tip; and g. retracting the pick-and-place arm by the second pneumatic cylinder to a pick location over the blade in preparation for the next cycle.

18. The method as stated in claim 17, wherein the air supply to the pneumatic cylinders is sequentially activated and deactivated by electrically operated solenoid valves controlled by the PLC.

* * * * *